US008187561B2

(12) United States Patent
Herman et al.

(10) Patent No.: US 8,187,561 B2
(45) Date of Patent: May 29, 2012

(54) PROCESSES AND SYSTEMS FOR RECOVERING CATALYST PROMOTER FROM CATALYST SUBSTRATES

(75) Inventors: Michael S. Herman, Gansevoort, NY (US); Michael J. Delsignore, Queensbury, NY (US); Len D. Spaulding, Newark, DE (US); James E. Phillips, Sr., Oxford, PA (US)

(73) Assignee: Ames Goldsmith Corporation, Glen Falls, NY (US)

( * ) Notice: Subject to any disclaimer, the term of this patent is extended or adjusted under 35 U.S.C. 154(b) by 252 days.

(21) Appl. No.: 11/950,468

(22) Filed: Dec. 5, 2007

(65) Prior Publication Data

US 2009/0148361 A1 Jun. 11, 2009

(51) Int. Cl.
*C01G 45/00* (2006.01)

(52) U.S. Cl. .................. 423/49; 423/1; 423/22; 423/23; 502/22

(58) Field of Classification Search .............. 423/1, 49, 423/22, 23; 502/22
See application file for complete search history.

(56) References Cited

U.S. PATENT DOCUMENTS

| | | | | |
|---|---|---|---|---|
| 3,578,395 | A * | 5/1971 | Kluksdahl | 502/262 |
| 4,521,381 | A * | 6/1985 | Douglas et al. | 423/49 |
| 5,542,957 | A * | 8/1996 | Han et al. | 75/732 |
| 2003/0119658 | A1* | 6/2003 | Allison et al. | 502/38 |
| 2003/0158036 | A1 | 8/2003 | Muhler | |
| 2007/0203351 | A1* | 8/2007 | Matusz et al. | 549/533 |
| 2008/0293836 | A1 | 11/2008 | Schubert et al. | |
| 2009/0038441 | A1 | 2/2009 | McKenna | |

FOREIGN PATENT DOCUMENTS

| | | |
|---|---|---|
| DE | 10 2005 061954 A1 | 7/2007 |
| JP | 56021604 A * | 2/1981 |
| WO | WO 9623585 A1 * | 8/1996 |
| WO | 2007099365 A1 | 9/2007 |
| WO | WO 2007099365 A1 * | 9/2007 |

OTHER PUBLICATIONS

Partial International Search Report for corresponding PCT application No. PCT/US2008/079459, mailed Mar. 1, 2010.
International Search Report and Written Opinion for corresponding PCT application No. PCT/US2008/079459, mailed May 7, 2010.
International Preliminary Report on Patentability for corresponding PCT application No. PCT/US2008/079459, mailed Jun. 8, 2010.

* cited by examiner

*Primary Examiner* — Melvin C Mayes
*Assistant Examiner* — Melissa Stalder
(74) *Attorney, Agent, or Firm* — Tech Valley Patent, LLC; John Pietrangelo

(57) ABSTRACT

Processes and systems for recovering promoter-containing compounds, for example, perrhenates, from promoter-containing catalyst substrates, for example, substrates containing precious metals, such as silver, are disclosed. The processes include contacting the substrates with a first solution adapted to remove at least some of the catalyst promoter from the substrates, for example, an oxidizing agent, to produce a second solution containing catalyst promoter, passing the second solution through a porous medium adapted to capture at least some of the catalyst promoter, for example, a ion exchange resin; and passing a third solution, for example, a base solution, through the porous medium to remove at least some of the catalyst promoter from the porous medium and produce a fourth solution containing compounds having a catalyst promoter. Systems adapted to practice these processes are also disclosed.

18 Claims, 3 Drawing Sheets

PROCESSES AND SYSTEMS FOR RECOVERING CATALYST PROMOTER FROM CATALYST SUBSTRATES

BACKGROUND OF THE INVENTION

1. Field of the Invention

The present invention generally relates to processes and systems for treating catalyst-containing substrates to recover at least some of the valuable elements from the substrates. More particularly, the present invention relates to processes and systems for treating catalyst substrates to recover catalyst promoter elements, for example, rhenium.

2. Description of Related Art

Metal catalysts are typically used to promote or enhance the reaction of many commercially significant chemical reactions. For instance, silver (Ag) impregnated on an alumina substrate serves as a catalyst for the reaction of ethylene and oxygen (referred to as an "epoxidation" reaction) to generate ethylene oxide (EO). Typically, the substrate may contain from about 8 to about 30% silver. However, the epoxidation reaction efficiency and selectivity is typically improved by the addition of catalyst "promoters" to the substrate. One of the promoters typically used in the EO epoxidation reaction is rhenium (Re).

Rhenium is a rare polyvalent transition metal and is one of the most dense elements known. Rhenium also has one of the highest melting points, and the widest range of oxidation states of any known element. Rhenium is a by-product of molybdenum refining and is distinguished as being the last naturally occurring element discovered.

Commercially, in addition to use as a promoter in EO epoxidation, rhenium is used in platinum-rhenium catalysts for the production of lead free high-octane gasoline. Rhenium is also used in high temperature alloys for jet engine parts. It is one of the ten most expensive elements on Earth.

Among other uses, there are approximately 120 EO plants in the world in the early $21^{st}$ century. Each of these EO plants typically contains 80 to 500 tons of EO epoxidation catalyst, and a portion of these plants use rhenium promoted catalyst. The EO catalyst is typically replaced every one to two years as the catalytic efficiency and the selectivity of the catalyst decreases. Due to the high concentration of silver on the catalyst substrate and the high value of the silver, the silver is typically recovered and refined from the spent EO catalyst substrate.

Rhenium promoted EO catalyst substrate typically contains about 100 to about 1000 parts per million [ppm] of rhenium. The high value of rhenium and the large volume of rhenium promoted catalyst substrate used worldwide encourages the investigation of methods of recovering and refining rhenium from spent EO catalyst substrates to, for example, re-use the rhenium for new rhenium promoted catalyst substrates.

Clearly, if a process can be provided for recovering these catalyst promoters, these valuable materials can be reused and, for example, not released into the environment.

SUMMARY OF ASPECTS OF THE INVENTION

Aspects of the present invention provide processes and systems for recovering rhenium, and other promoter elements, and rhenium-containing compounds, and other promoter-containing compounds, from promoter-containing substrates, for example, promoter containing catalyst substrates.

One aspect of the invention is a process for recovering compounds having a catalyst promoter from substrates having a catalyst and a catalyst promoter, the process comprising contacting the substrates with a first solution adapted to remove at least some of the catalyst promoter from the substrates to produce a second solution containing catalyst promoter; passing the second solution containing the catalyst promoter through a porous medium adapted to capture at least some of the catalyst promoter on the porous medium; and passing a third solution through the porous medium adapted to remove at least some of the catalyst promoter from the porous medium and produce a fourth solution containing compounds having a catalyst promoter. The catalyst promoter may be rhenium (Re), chromium (Cr), tungsten (W), molybdenum (Mo), ruthenium (Ru), rhodium (Rh), or combinations thereof. In one aspect, the catalyst may be a metallic catalyst, for example, a transition metal catalyst, for example, platinum (Pt), palladium (Pd), or iron (Fe), or a Group 11 element, that is, copper (Cu), silver (Ag), gold (Au), or combinations thereof.

Another aspect of the invention is a process for recovering compounds having a rhenium (Re) from substrates having a silver (Ag) catalyst and rhenium promoter, the process comprising contacting the substrates with a first solution adapted to remove at least some of the rhenium from the substrates to produce a second solution containing at least some rhenium; passing the second solution containing rhenium through a porous medium adapted to capture at least some of the rhenium on the porous medium; and passing a third solution through the porous medium adapted to remove at least some of the rhenium from the porous medium and produce a fourth solution containing compounds having rhenium. In one aspect, the first solution may consist of water or may comprise an oxidizing agent, such as, a peroxide; an acid; a permanganate, for example, potassium permanganate; a persulfate, for example, potassium persulfate; a chlorate, for example, sodium chlorate; or a nitrate, for example, sodium nitrate. In another aspect, the porous medium comprises an ion exchange resin, for example, a basic ion exchange resin, such as, a weak base ion exchange resin and a strong base ion exchange resin. In one aspect, the third solution may comprises one of an acid, for example, nitric acid, hydrochloric acid, or sulfuric acid; or a base, for example, ammonium hydroxide or sodium hydroxide.

A further aspect of the invention is a system for recovering at least some promoter-containing compounds from substrates containing a catalyst and a catalyst promoter, the system comprising a column reactor containing substrates having a catalyst and a catalyst promoter; means for contacting the substrates with a first solution adapted to remove at least some of the catalyst promoter from the substrates to produce a second solution containing catalyst promoter; a porous medium adapted to capture at least some of the catalyst promoter on the porous medium; means for passing the second solution containing the catalyst promoter through the porous medium to capture at least some of the catalyst promoter on the porous medium; and means for passing a third solution through the porous medium adapted to remove at least some of the catalyst promoter from the porous medium and produce a fourth solution containing compounds having a catalyst promoter. Again, in one aspect, the catalyst promoter may be rhenium (Re), chromium (Cr), tungsten (W), molybdenum (Mo), ruthenium (Ru), rhodium (Rh), or combinations thereof. The catalyst may be a metallic catalyst, for example, a transition metal catalyst, for example, platinum (Pt), palladium (Pd), or iron (Fe), or a Group 11 element, that is, copper (Cu), silver (Ag), gold (Au), or combinations thereof. In one aspect, the means for contacting the substrates with a first solution comprises means for contacting the substrates with water or an oxidizing agent. In another aspect, the porous medium may be a bed of ion exchange resin, such as, a basic ion exchange resin.

A further aspect of the invention is a process for recovering compounds having a catalyst promoter from substrates having a catalyst and a catalyst promoter, the process comprising contacting the substrates with a first solution adapted to remove at least some of the catalyst promoter from the substrates to produce a second solution containing catalyst promoter; and isolating at least some of the catalyst promoter in the second solution. In one aspect, isolating at least some of the catalyst promoter may be practiced by concentrating the second solution. In another aspect, isolating at least some of the catalyst promoter may be practices by reverse osmosis, for example, by vibration reverse osmosis. In another aspect, isolating the catalyst promoter may be practices by passing the second solution containing the catalyst promoter through a porous medium adapted to capture at least some of the catalyst promoter on the porous medium; and passing a third solution through the porous medium adapted to remove at least some of the catalyst promoter from the porous medium and produce a fourth solution containing compounds having a catalyst promoter.

A still further aspect of the invention is a process for recovering compounds having rhenium (Re) from substrates having a silver (Ag) catalyst and rhenium promoter, the method comprising contacting the substrates with a first solution adapted to remove at least some of the rhenium from the substrates to produce a second solution containing at least some rhenium; and isolating at least some of the rhenium in the second solution. In one aspect, isolating at least some of the rhenium may be practiced by concentrating the second solution. In another aspect, isolating at least some of the rhenium may be practiced by reverse osmosis, for example, vibration reverse osmosis. In another aspect, isolating rhenium may be practiced by passing the second solution containing rhenium through a porous medium adapted to capture at least some rhenium on the porous medium, for example, an ion exchange resin; and passing a third solution, for example, a base solution, through the porous medium adapted to remove at least some rhenium from the porous medium and produce a fourth solution containing compounds having rhenium.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF ASPECTS OF THE INVENTION

Figure 1A:
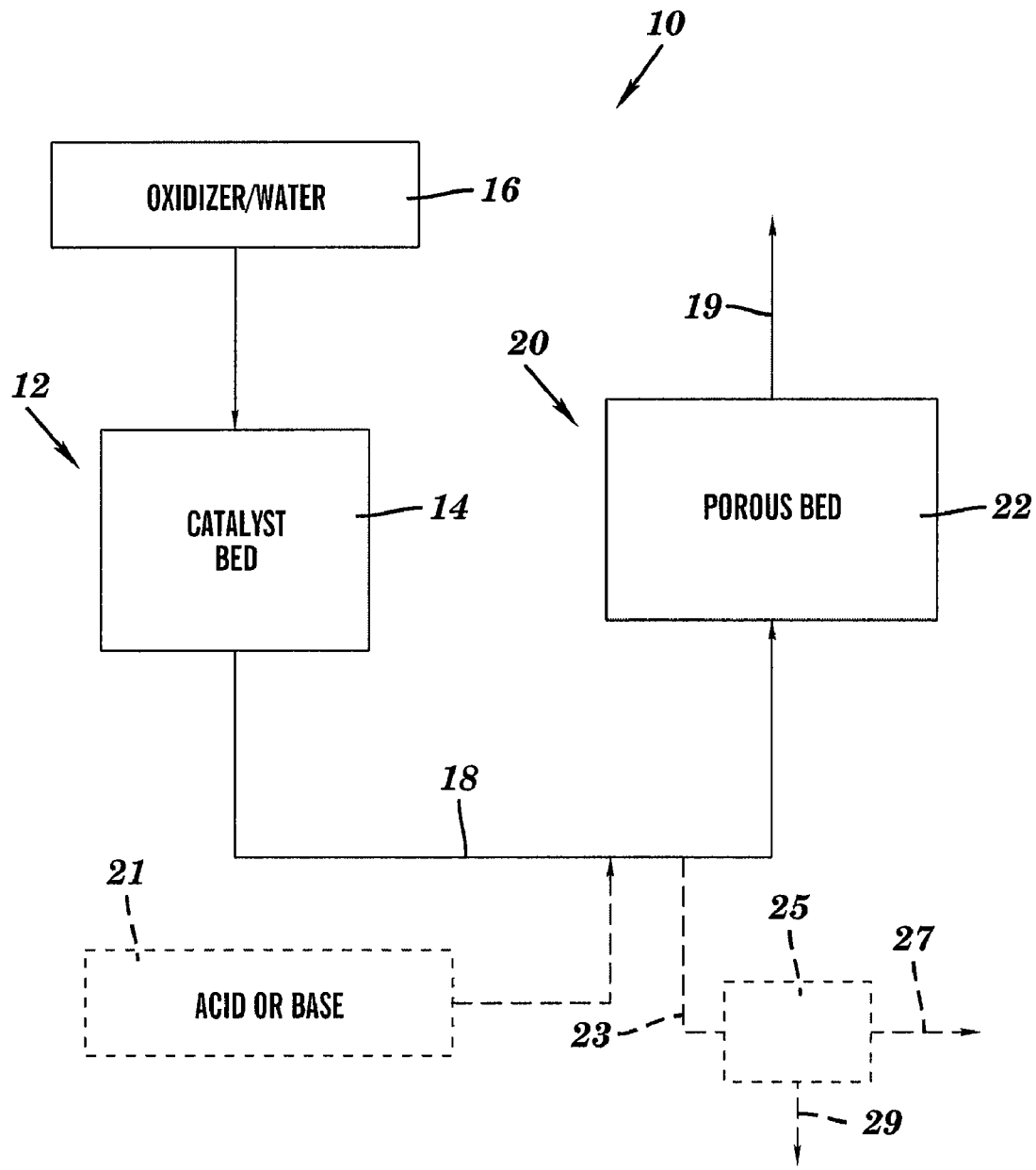
FIG. 1A is a schematic illustration of a process for recovering compounds having a catalyst-promoting element from substrates according to one aspect of the invention.

FIG. 1A is a schematic illustration of a process 10 for recovering compounds having a catalyst-promoting element according to one aspect of the invention. In its broadest aspect, process 10 comprises the steps of 12 contacting a porous bed of substrates 14 having a catalyst and a catalyst-promoting element, that is, "a promoter," with a solution 16 adapted to remove at least some of the catalyst-promoting element to produce a promoter-containing solution 18. The promoter-containing solution 18 is then passed 20 through a porous bed 22 of material adapted to extract the promoter from solution 18 to provide a bed of porous material 22' containing the promoter. Then a solution 24 is passed 26 through the porous bed 22' containing the promoter to remove at least some of the promoter from the porous bed 22' to produce a solution 28 containing the promoter that can be further processed. For example, the solution 28 may be concentrated to produce a concentrated solution of compounds containing promoter and/or purified to isolate at least some promoter from other elements.

In one aspect of the invention, the catalyst may comprise a metallic catalyst, for example, a transition metal catalyst. Though aspects of the invention may be applied to recovery of promoters associated with any metallic catalyst, in one aspect, the metallic catalyst is typically a metal that is a member of Group 11 of the Periodic Table, specifically, copper (Cu), gold (Au), silver (Ag), or a combination thereof. According to one aspect of the invention, a typical catalyst is silver, for example, the silver catalyst used to catalyze the epoxidation of olefins, such as, ethylene, to form oxidized olefins, such as, ethylene-oxide (EO).

As is known in the art, catalyst promoters enhance the reaction catalyzed by the catalyst, for example, the enhancement of the epoxidation of ethylene to form EO. According to aspects of the invention, the promoter may comprise one of more of the elements rhenium, tungsten, molybdenum, chromium, ruthenium, rhodium or combinations or mixtures thereof. According to one aspect of the invention, a typical promoter is rhenium, which may be recovered in the form of a perrhenate (—$Re_nO_n$).

According to aspects of the invention, the catalyst and promoter are typically provided on a carrier or substrate 14, for example, particles or materials adapted to retain a catalyst and a promoter and used for contacting the catalyst and promoter with one or more reagents, for example, the oxygen and olefin mentioned above. The carrier material may be a natural or an artificial inorganic material, and may include refractory materials, silicon carbide, clays, zeolites, charcoal, and alkaline earth metal carbonates, for example calcium carbonate. In one aspect of the invention, the carrier material comprises one or more refractory materials, for example, alumina, magnesia, zirconia, and silica.

The solution 16 may be any solution adapted to remove at least some of the promoter, for example, rhenium, from the substrates 14 to produce the promoter-containing solution 18. In one aspect of the invention, solution 16 may simply comprise or consist of water, for example, tap water or deionized water, for example, substantially water alone with no other active species. In another aspect of the invention, solution 16 may comprise an oxidizing agent, for example, a strong oxidizing agent or a weak oxidizing agent. For instance, an acid, for example, nitric acid, sulfuric acid, or acetic acid; a peroxide, for example, hydrogen peroxide or sodium peroxide; a permanganate, for example, potassium permanganate; a persulfate, for example, potassium persulfate; a chlorate, for example, sodium chlorate; or a nitrate, for example, sodium nitrate, among other oxidizing agents, may be used for solution 16. In one aspect of the invention, an oxidizing solution, for example, a weak or dilute oxidizing solution, is preferred over water because it is believed that the oxidizing agent oxidizes the promoter specie, for example, rhenium, to produce an oxidized promoter, for example, a perrhenate ion of the form —$Re_nO_n^-$, for instance, the perrhenate ion, $ReO_4^-$, which increases the solubility of the promoter, for example, rhenium, in solution. According to an aspect of the invention, by enhancing the solubility of the promoter-containing ions, removal of promoter from the substrate 14 and subsequent recovery is facilitated.

Solution 16 may comprise a "weak" oxidizing solution, that is, a solution having an oxidizing agent at a relatively low concentration, for example, a concentration less than about 20% of solution 16 by weight. Solution 16 may also comprise a "strong" oxidizing solution, that is, a solution having an oxidizing agent at a relatively higher concentration, for example, a concentration of greater than 20% of solution 16 by weight. In one aspect of the invention, solution 16 may contain little or no alkali earth metal ions, such as, sodium ions or potassium ions, which can contaminate solution 18. Though some aspects of the invention are tolerant of alkali earth metal ions, in one aspect of the invention, it is preferred that the oxidizing agent has little or no potential to introduce alkali earth metal ions to solution 18. For example, in one aspect, oxidizing agents sodium peroxide and potassium persulfate, which are likely to introduce alkali earth metal ions to solution 18 may be used, but are typically avoided. In another aspect of the invention, the solution 18 may contain little or no catalysts, for example, metal catalysts, such as, silver or gold. The presence of catalysts in solution 18 may complicate or hinder the subsequent treatment and recovery of the promoter, such as, rhenium. Though some aspects of the invention are tolerant of the presence of catalysts in solution 18, in one aspect, the oxidizing agent in solution 16 may have little or no potential to strip the metallic catalysts from the substrate. For example, in one aspect, acidic oxidizing agents, such as, nitric acid or sulfuric acid, which are likely to strip metallic catalysts (and metallic promoters) from substrates 14 and thus introduce metallic catalysts (other than and in addition to metallic promoters) to solution 18, may be used, but are typically avoided. One oxidizing agent that provides the benefits of not introducing alkali earth metal ions and being less likely to or not stripping metallic catalysts from the substrates is hydrogen peroxide. In one aspect, hydrogen peroxide is a preferred oxidizing agent for solution 16. For example, in one aspect of the invention, solution 16 may comprise a weak or dilute solution of hydrogen peroxide, for instance, an aqueous solution of hydrogen peroxide having a concentration of hydrogen peroxide of between about 1% to about 50% by weight, for example, about 5% and about 15% by weight, of solution 16.

According to aspects of the invention, after removal of the promoter from substrates 14 with solution 16 to produce a promoter-containing solution 18, the promoter-containing solution 18 is passed 20 through a porous bed 22 of material adapted to extract the promoter from solution 18 to provide a bed of porous material 22' containing the promoter and a promoter depleted stream 19. Though any porous bed adapted to retain at least some promoter may be used, in one aspect of the invention, porous bed 22 may comprise a bed of ion-exchange resin, for example, a basic ion exchange resin, for instance, a "weak base" ion exchange resin or a "strong base" ion exchange resin. As is known in the art, an ion exchange resin is typically an insoluble matrix of small particles, beads, or pellets (about 1-2 mm diameter) made from an organic polymer substrate. The resin particles typically have a highly developed structure of pores on their surfaces which trap and release ions, for example, in aspects of the present invention, promoter-containing ions. According to aspects of the invention, during the passage of promoter-containing solution 18 through resin bed 22 at least some promoter containing ions are trapped or "coordinated" by the resin bed. In some aspects of the invention, the pH of the promoter-containing solution 18 may be adjusted with the addition of an acid or a base 21, as indicated in phantom in FIG. 1A.

In one aspect of the invention, resin bed 22 may be a weak base ion exchange resin, for example, the weak base ion exchange resin marketed under the name A-170 by Purolite, or its equivalent. When using a weak base ion exchange resin, the pH of the promoter-containing solution 18 may be adjusted with the addition of an acid 21, for example, a strong acid, such as, sulfuric acid, to adjust the pH of solution 18 to between about 3.0 and 3.5, prior to introducing solution 18 to weak base resin bed 22. In one aspect, nitric acid is avoided for use in adjusting the pH of solution 18 due to the known high affinity of some weak base ion exchange resins for the $NO_3^-$ ion, which would interfere with the desired coordination of promoter-containing ions.

Figure 1B:
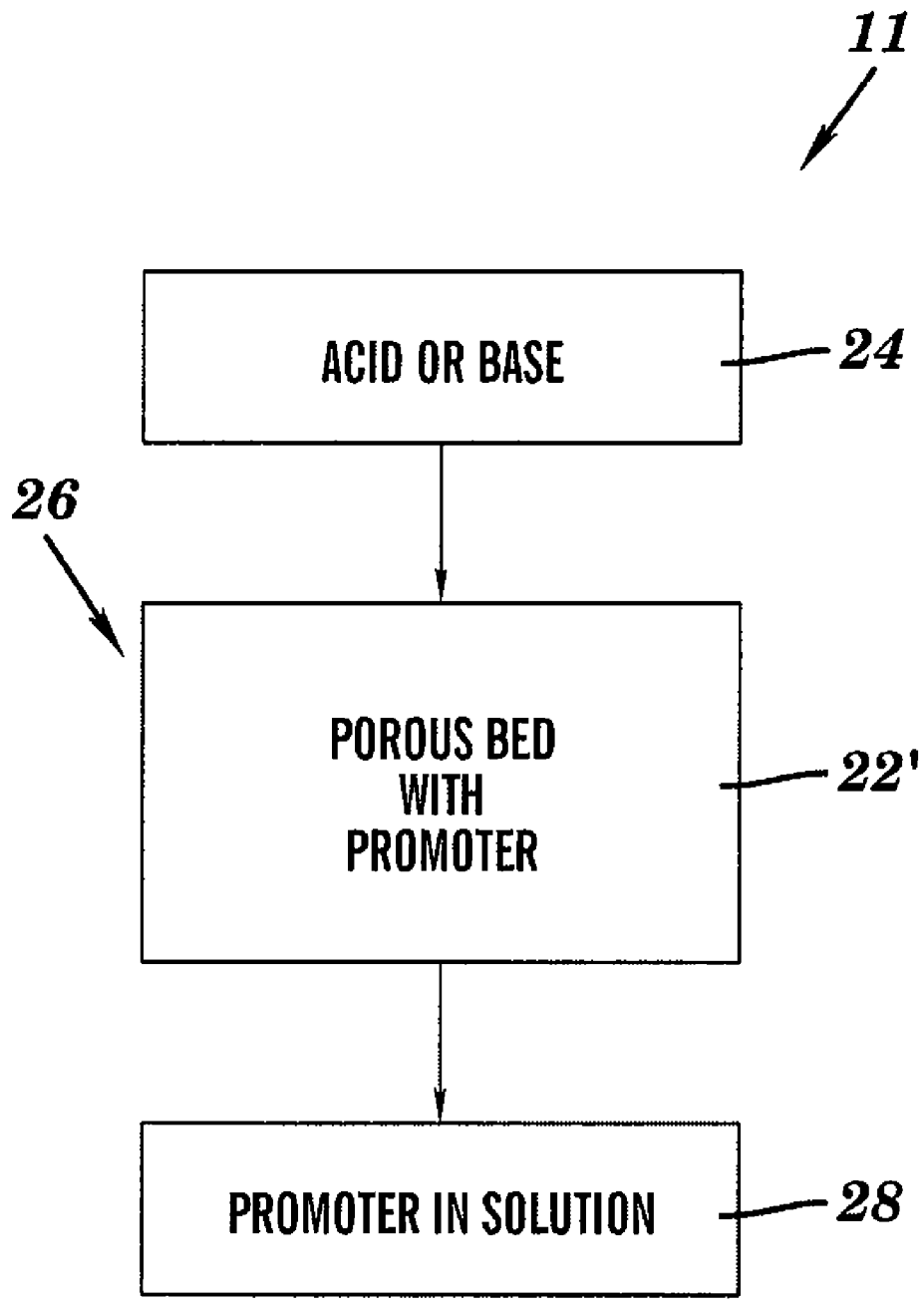
FIG. 1B is a schematic illustration of another process for recovering compounds having a catalyst-promoting element from substrates according to one aspect of the invention.

FIG. 1B is a schematic illustration of another process 11 for recovering promoter-containing compounds. Once the weak base resin bed 22' is coordinated with promoter-containing ions, for example, rhenium-containing ions, the promoter-containing ions are washed, stripped, or "eluted" from the resin bed 22' with a base solution 24 to produce a promoter ion containing eluate 28. In one aspect, the base solution 24 may be a strong base solution. According to aspects of the invention the base solution 24 may be a solution of ammonium hydroxide or sodium hydroxide, or their equivalents, for example, having a pH ranging from about 8 to about 14, for instance, typically having a pH between about 11 and about 14. In one aspect of the invention, ammonium hydroxide is used as the base to elute the weak base resin bed to produce an ammoniated promoter, for example, to produce ammonium perrhenate. An ammoniated promoter may be purified by re-crystallization, for example, ammonium perrhenate is a solid that can be purified by re-crystallization. In one aspect of the invention, the passing of the base solution 24 through the promoter-ion-containing, weak base resin bed 22' may increase the promoter concentration in the elutate 28 by a factor of about 5 to about 15 times the promoter concentration of the promoter-containing solution 18 obtained from the catalyst bed 12.

In another aspect of the invention, resin bed 22 may be a strong base ion exchange resin, for example, the strong base ion exchange resin marketed under the name A-600 by Purolite, or its equivalent. Once the strong base resin bed 22' is coordinated with promoter-containing ions, for example, rhenium-containing ions, the promoter-containing ions are washed, stripped, or "eluted" from the strong base resin bed with an acid solution 24 to produce a promoter ion containing eluate 28. In one aspect, the acid solution 24 may be a strong acid solution. When using a strong base resin 22', the acid solution 24 may be a solution of nitric acid, hydrochloric acid, or sulfuric acid, or their equivalents, for example, having a pH ranging from about 0 to about 6, for instance, typically having a pH less than about 2.

In one aspect, nitric acid may be used as the eluant of a strong base ion exchange resin 22', for example, a 7-10 M nitric acid. In one aspect, nitric acid is preferred because nitric acid is a more efficient eluate than, for example, hydrochloric acid. According to one aspect, the passing of the strong acid solution 24 through the promoter ion containing, strong basic resin bed 22' may increase the promoter concentration in the eluate 28 by a factor of about 5 to about 15 times the promoter concentration of the promoter-containing solution 18 obtained from the catalyst bed 12. Though in aspects of the invention, a strong base ion exchange resin 22 may be used to concentrate promoter ions, for example, perrhenate ions, in other aspects of the invention, the use of strong base ion exchange resin is not as preferred as the use of weak base ion exchange resin. This is because the process of using a strong base ion exchange resin may produce promoter containing solutions 28 having a relatively higher acid concentration, for example, higher nitric acid concentration, that typically are more difficult to process, for example, more difficult to process to recover promoter, than the weak base ion exchange process.

The promoter-containing solution 28 may be further processed to concentrate the promoter-containing compounds or isolate the promoter from other elements. For example, solution 28 may be concentrated by evaporation, filtration, or osmosis, for example, by reverse osmosis (RO) or vibration osmosis, for instance, by the VSEP® vibration osmosis concentration system provided by New Logic Research Inc. For example, when processing a solution 28 containing rhenium, the concentration of rhenium can be increased by a factor of about 5 to about 20 times the concentration of rhenium in solution 28 by RO or VSEP concentration.

According to another aspect of the invention, as shown in phantom in FIG. 1A, the promoter-containing solution 18 may be treated by a process 25 to isolate at least some of the promoter from promoter-containing solution 18. Instead of passing promoter-containing stream 18 through porous bed 22, solution 18 may be passed through conduit 23 to process 25 to produce a promoter-enhanced stream 27 and a promoter depleted stream 29. Process 25 may comprise any process adapted to treat promoter-containing stream 18 to produce a promoter-enhanced stream 27. Process 25 may be an evaporation, filtration, or osmosis process, for example, a reverse osmosis, for instance, one of the reverse osmosis processes referenced above. For example, in one aspect, the solution 16 may be an oxidizing solution adapted to remove at least some of the promoter from substrates 14, for instance, hydrogen peroxide, whereby solution 18 comprises promoter, among other species, and process 25 is adapted to isolate at least some of the promoter to produce a promoter enhanced stream 27 and, for example, a promoter depleted stream 29.

Figure 2:
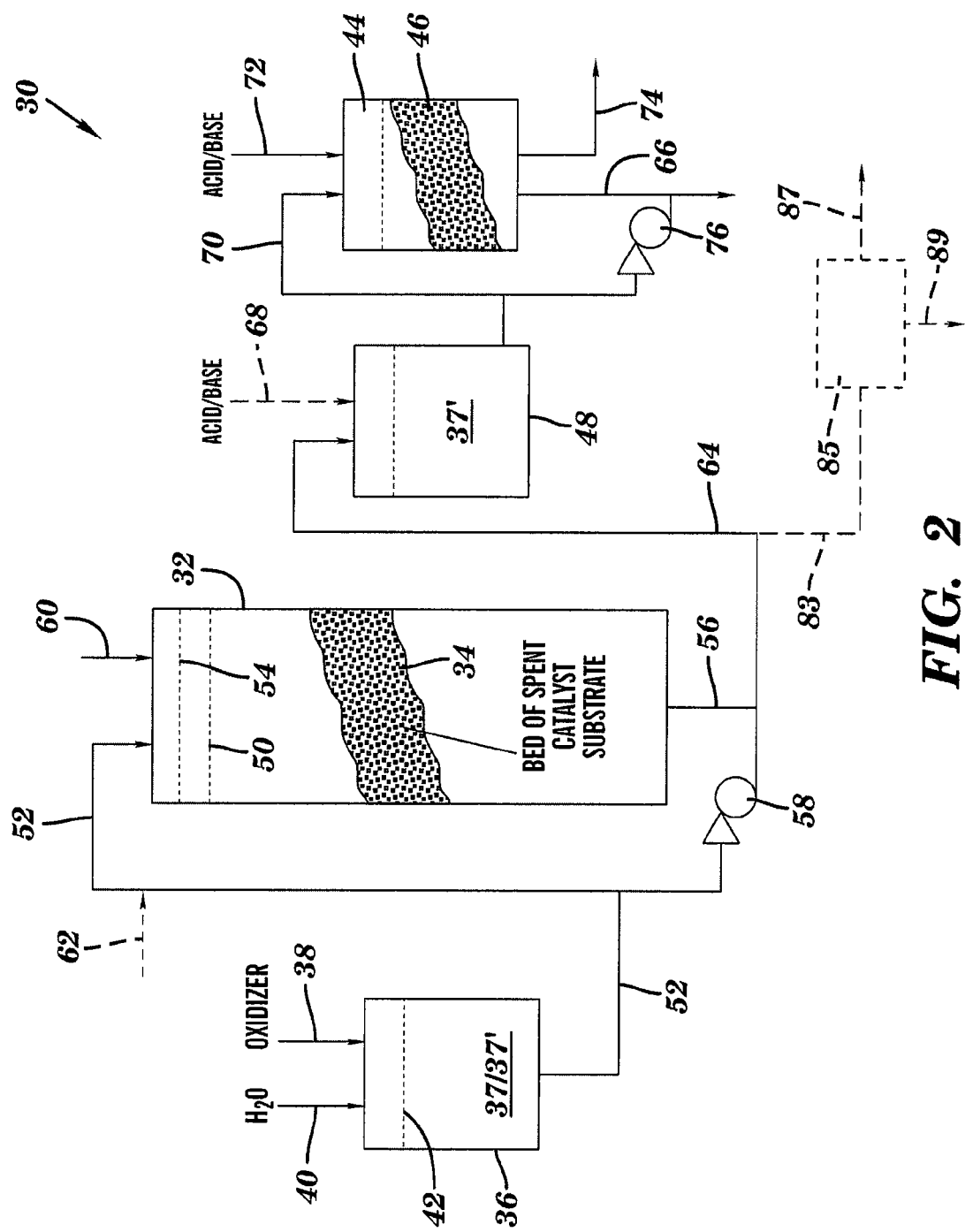
FIG. 2 is a schematic illustration of a system for recovering compounds having a catalyst-promoting element from substrates according to another aspect of the invention.

FIG. 2 is a schematic illustration of a system 30 for recovering compounds having a catalyst-promoting element according to another aspect of the invention. System 30 includes a contact vessel or tower 32 containing at least some carrier material 34 having a catalyst, such as, a Group 11 metallic catalyst, and a promoter, such as rhenium or chromium. In FIG. 2, vessel 32 is shown in a partially cut-away view to illustrate the presence of carrier material or substrate 34 in vessel 32. The catalyst substrates 34, typically, spent catalyst substrates, may be provided for refining and reclamation of their precious metal content, for example, platinum, palladium, gold or silver, and their rare metal content, for example, chromium, tungsten, rhenium, molybdenum, ruthenium, or rhodium, contained within the substrate. Typically, the catalyst substrate may be screened to separate the different substrate particle sizes, and representative samples of the substrate may be analyzed for their precious metal and rare metal content. In one aspect of the invention, substrate 34 may include a spent silver catalyst having a rhenium promoter that was used in an EO epoxidation process discussed above.

Vessel 32 may include a substantially continuous column of material 34, for example, vessel 32 may be a fixed-bed reactor, or may include one or more baffles or shelves (not shown) holding material 34. Vessel 32 may typically include numerous nozzles or access ports for introducing or removing material 34 and process fluids as is conventional.

System 30 also includes a mixing tank or vessel 36 in which process fluid or treatment solution 37 may be mixed or stored prior to introduction to vessel 32. Vessel 36 may be a metal or polymer tank. In one aspect of the invention tank 36 may be used to combine an oxidizing agent or oxidizer 38 with water 40 to a level 42 prior to introducing the aqueous oxidizing agent to vessel 32. As discussed above, in one aspect, oxidizing agent 38 may be water or a peroxide, for example, hydrogen peroxide. Vessel 36 may include one or more agitating or mixing devices (not shown) for mixing the water 40 and oxidizer 38. Vessel 36 may typically include numerous nozzles or access ports as is conventional.

System 30 also includes a vessel 44 containing a bed of porous material 46 adapted to extract a promoter from a promoter containing solution, such as, solution 18, illustrated and discussed with respect to FIG. 1A. In FIG. 2, vessel 44 is shown in a partially cut-away view to illustrate the presence of porous material 46 in vessel 44. According to aspects of the invention, porous material 46 may be any material adapted to capture promoter-containing material, such as, ions. In one aspect, porous material 46 may be a bed of ion-exchange resin, for example, a weak base or a strong base ion exchange resin, as discussed above. Vessel 44 may typically include numerous nozzles or access ports as is conventional. Vessel 44 may be a metal or polymer tank.

System 30 may also include a vessel or tank 48 for preparing or storing process fluids after or prior to use, for example, for preparing process fluids prior to forwarding the fluid to vessel 46. The role of vessel 48 will be made more apparent upon review of the typical process description below. Vessel 48 may also be a metal or polymer tank.

According to aspects of the present invention, system 30 may be used to recover promoter-containing compounds from carrier materials having catalysts and catalyst promoter, such as, rhenium. For example, in one aspect of the invention, when employing system 30, a carrier material or substrate 34 having a catalyst and a promoter, for example, carrier having spent Ag catalyst and Re promoter, may be introduced to vessel 32, for example, through an access port at the top of vessel 32, to provide a column of substrate 34 having a level 50.

Prior to, during, or after introducing substrate 34 to vessel 32, a treatment solution 37 is prepared in vessel 42. In one aspect, treatment solution 37 may be substantially water, for example, deionized water. However, in one aspect of the invention, the treatment solution 37 in vessel 36 may be an aqueous solution of an oxidizing agent, for example, a strong oxidizing agent or a weak oxidizing agent. For instance, in one aspect, the oxidizing agent may be hydrogen peroxide, and the solution 37 in vessel 36 may comprise an aqueous solution of hydrogen peroxide at a concentration of between about 3% by volume to about 25% by volume, or, typically, between about 5% by volume to about 15% by volume.

When the solution 37 in vessel 36 is prepared and vessel 32 contains the amount of substrate desired, the solution 37 in vessel 36 is introduced to vessel 32 via conduit 52. The transfer of solution 37 from vessel 36 to vessel 32 may be effected by gravity or by means of one or more pumps (not shown). According to one aspect of the invention, treatment solution 37 is introduced to vessel 32 to provide a level 54 of solution 37 in vessel 32, that is, a level 54 above the level 50 of substrate 34 whereby the substrate 34 is typically completely submerged. Solution 37 may be introduced to the top vessel 32 through one or more nozzles, or one or more distribution baffles positioned in the top of vessel 32. If necessary, some water 60 may be introduced to vessel 32 to completely submerge the substrate 34.

According to one aspect of the invention, when vessel 32 having substrate 34 is provided with, for example, filled with solution 37, solution 37 is circulated through the bed of substrate 34. For example, the circulation of solution 37 through vessel 32 may be provided by drawing solution 37 from the bottom of vessel 32 by means of one or more extraction conduits 56 and one or more pumps 58. Pump 58 recirculates solution 37 to conduit 52 whereby the treatment solution 37 is reintroduced to vessel 32 and circulated through the bed of substrate 34 as desired. In one aspect of the invention, solution 37 may be drawn from the top of vessel 32 and reintroduced to the bottom of vessel 32. In one aspect of the invention, water or the oxidizing solution is circulated through the bed of substrate 34 for a predetermined time period, for example, for about 5 minutes to about 3 hours, or typically for about 10 minutes to about 60 minutes. The circulating solution may be monitored to determine the change in promoter content and the strength of the oxidizer as the solution is circulated. Additional oxidizing agent may be added to the solution as needed, for example, as indicated by arrow 62 in phantom.

When circulation is completed, for example, after a predefined time period or when the promoter content has reached a predetermined level, the solution 37', containing promoter, may be returned to vessel 36, for example, via pump 58. Vessel 32 may then be drained of solution 37' to vessel 36. After draining, the catalyst substrate 34 may be rinsed with water 60 to remove any promoter from substrates 34. The rinse water, which may contain some residual promoter, may also be returned to vessel 36. By this process, the stripping or removal of promoter from at least one vessel full of substrate 34 is completed. According to one aspect of the invention, the solution 37' containing promoter may now be processed further to recover the promoter. However, as discussed below, in another aspect, vessel 32 may be emptied of the treated promoter-depleted substrate 34' and refilled with a new batch of promoter-containing substrate 34 and the process repeated. As is conventional, extraction conduit 56 and conduit 52 may include appropriate flow monitoring, regulating, and control devices, for example, valves and flow meters, to direct, regulate, and control the direction and volume of flow desired.

According to one aspect of the invention, after treatment with oxidizing solution 37 to produce a promoter containing solution 37' and a promoter-depleted substrate 34', the promoter-depleted substrate 34' may be removed from the reactor vessel 32 and replaced with a new supply of promoter-containing substrate 34. Additional oxidizing agent 38 may be added to the promoter-containing solution 37' in vessel 36, that is, the promoter-containing solution 37' produced during the initial treatment, and the promoter-containing solution 37' may now be introduced to the new batch of promoter-containing substrate 34. The promoter-containing solution 37' may be circulated through the bed of new promoter-containing substrate 34 to increase the promoter content of the s promoter-containing solution 37' even further. In one aspect, a solution 37, 37' may be used to remove promoter from 2 or more batches of promoter-containing substrate 34, for example, as many as 6 or more batches may be treated with a single solution, for example, with appropriate adjustment of oxidizing agent. After treatment of 2 or more batches of substrate 34, the promoter-enhanced solution 37' may be transferred to holding tank 48, for example, from vessel 32 and/or vessel 36 via conduit 64 prior to further treatment. The promoter concentration in promoter-enhanced solution 37' may vary from 100 to 3000 ppm, for example, when rhenium is the promoter being handled, the rhenium content of the solution introduced to tank 48 may range from about 500 ppm to about 2500 ppm, and is typically between about 700 ppm and about 2000 ppm of rhenium. The promoter content of solution 37' may be determined by Inductively Coupled Plasma Optical Emission Spectroscopy (ICP-OES), among other methods.

According to aspects of the invention, after producing a promoter-enhanced solution 37', for example, a solution enhanced with chromium, rhenium, tungsten, molybdenum, ruthenium, or rhodium, and stored in tank 48, the promoter may be removed from solution 37' by passing solution 37' through a porous bed 46 of material adapted to extract the promoter from solution 37' to provide a bed of porous material 46' containing the promoter and a promoter depleted stream 66. As discussed above, though any porous medium adapted to retain at least some promoter may be used, in one aspect of the invention, porous bed 46 may comprise a bed of ion-exchange resin, for example, a basic ion exchange resin, for instance, a "weak base" ion exchange resin or a "strong base" ion exchange resin. In some aspects of the invention, the pH of the promoter-containing solution 37' may be adjusted with the addition of an acid or a base 68, as indicated in phantom in FIG. 2. In one aspect, the promoter-enhanced solution 37' may be forwarded from tank 48 to vessel 44 via conduit 70, for example, by gravity or by means of one or more pumps (not shown). For example, the promoter-enhanced solution 37' may be passed, for example, pumped, through the resin bed 46 at a flow rate of about 10 to about 200 gallons per minute (gpm), typically about 40 to about 80 gpm. The concentration of the promoter, for example, rhenium, in the promoter-depleted solution 66 during processing through the ion exchange resin 46 may be monitored by ICP-OES. In one aspect, of the invention, promoter-enhanced solution 37' may be passed through bed 46 in vessel 44 at least once. However, typically, the promoter-enhanced solution 37' may be circulated through bed 46 a plurality of times, for example, 3 to 200 times over a time period of 1 to 5 hours in order to coordinate as much of the promoter onto resin bed 46. This circulation of promoter-enhanced solution 37' through resin bed 46 may be practiced by means of one or more conduits 66, one or more pumps 76, and one or more conduits 70. The resin bed 46 may containing from about 10 to about 200 kilograms (kg) of resin, but may typically contain about 40 kg to about 60 kg of resin. As discussed above, depending upon the desired processing conditions, the resin 46 may be a weak base ion exchange resin marketed under the name A-170 by Purolite, or its equivalent, or may be the strong base ion exchange resin marketed under the name A-600 by Purolite, or its equivalent. Depending upon the amount and type of resin used, the amount of promoter that can be coordinated by the resin may vary. For example, in one aspect of the invention, when the amount of resin is about 40-60 kg of A-170 weak base resin and the promoter is rhenium, the resin may coordinate between about 6 kg and about 10 kg of rhenium as perrhenate.

In one aspect, the promoter obtained from multiple batches of promoter-containing substrate in vessel 32 may be processed through a single resin bed 46 until the capacity of the resin bed 46 has been achieved. In another aspect of the invention, multiple vessels 32 containing multiple batches of promoter-containing substrate 34 may be processed in parallel and the resulting one or more promoter-enhanced solutions 37' may be processed by one or more vessels 44 having resin 46. In another aspect of the invention, promoter depleted stream 66 may be passed through one or more further resin beds 46 in one or more vessels 44 to coordinate further promoter from promoter depleted stream 66.

After the porous bed 46', for example, the resin bed, is coordinated with promoter containing compounds, for example, perrhenate, the promoter containing compounds may be removed, that is, washed, striped, or eluted, from the promoter-containing bed 46 with an acid or base solution or eluant 72 to produce a promoter containing solution or eluate 74. In one aspect, solution 72 may be base solution, for example, a strong base solution. According to aspects of the invention, the base solution 72 may be a solution of ammonium hydroxide or sodium hydroxide, or their equivalents, for example, having a pH ranging from about 8 to about 14, for instance, typically having a pH between about 11 and about 14. In one aspect of the invention, when bed 46 comprises a weak base resin bed, ammonium hydroxide is used as the base eluant to produce an ammoniated promoter, for example, to produce ammonium perrhenate, in eluate 74. In another aspect of the invention, when resin bed 46 comprises a strong base ion exchange resin, eluant 72 may be an acid solution, for example, a strong acid solution, for instance, a solution of nitric acid, hydrochloric acid, or sulfuric acid, or their equivalents. In one aspect, the acid eluant 72 may have a pH ranging from about 0 to about 6, for instance, typically having a pH less than about 2.

The promoter-containing eluate 74 may be further processed to concentrate the promoter-containing compounds or isolate the promoter from other elements. For example, solution 74 may be concentrated by reverse osmosis, RO, and/or VSEP filtration.

According to another aspect of the invention, as shown in phantom in FIG. 2, the promoter-containing solution 37' may be treated by a process 85 to isolate at least some of the promoter from promoter-containing solution 37'. Instead of passing promoter-containing stream 37' through porous bed 46, solution 37' may be passed through conduit 83 to process 85 to produce a promoter-enhanced stream 87 and a promoter depleted stream 89. Process 85 may comprise any process adapted to treat promoter-containing stream 37' to produce a promoter-enhanced stream 87. Process 85 may be an evaporation, filtration, or osmosis process, for example, a reverse osmosis, for instance, one of the reverse osmosis processes referenced above. For example, in one aspect, the solution 37 may be an oxidizing solution adapted to remove at least some of the promoter from substrates 34, for instance, hydrogen peroxide, whereby solution 37' comprises promoter, among other species, and process 85 is adapted to isolate at least some of the promoter to produce a promoter enhanced stream 87 and, for example, a promoter depleted stream 89.

Experimental Data

The following experimental data is provided to illustrate the effectiveness of aspects of the present invention. In these experiments, alumina substrates having silver (Ag) catalyst and rhenium (Re) promoter were treated in a system similar to system 30 shown in FIG. 2. The oxidizing agent used is hydrogen peroxide ($H_2O_2$) at the concentrations indicated. In the following discussion, reference is made to the reference numbers that appear in FIG. 2.

1) Hydrogen Peroxide Stripping, Weak Base Ion Exchange Resin Processing

In this first step, an aqueous $H_2O_2$ solution is prepared in holding tank 36 by slowly adding two 55-gallon drums of 50 weight percent $H_2O_2/H_2O$ to 400 gallons of water, to provide about a 12% $H_2O_2$ solution 37. The solution 37 is circulated through a total of four different reactors 32 containing substrates 34 having Ag catalyst and Re promoter following the procedure described above. A total of twenty reactor loads of substrate 34 are processed in this experiment. In the Table 1, the twenty reactor treatments are referred to as "Runs 1W-20W," and the data presented are for single solution 37/37' that were passed repeatedly through four (4) "fresh" batches of catalyst 34. For example, the data identified as "1W-4W" is the content of the solution 37 passed through catalyst batches 1W, 2W, 3W, and 4W. Similarly, the data identified as "5W-8W" is the content of the solution 37 passed through catalyst batches 5W, 6W, 7W, and 8W; and the data identified as "1W-8W" is the combined content of the solution 37 passed through catalyst batches 1W, 2W, 3W, and 4W and the solution 37 passed through catalyst batches 5W, 6W, 7W, and 8W. The twenty loads of alumina substrate 34 represent five distinct Re-containing "strip" solutions 37', and a total of 48,455 kg of Re-depleted, silver-containing alumina substrate 34'.

The Re-enhanced strip solutions 37' are then circulated through a resin bed 46 of 52.55 kg of A-170 weak base ion exchange resin (manufactured by Purolite) in vessel 44. Solution pH is adjusted to 3.0-3.5 by concentrated sulfuric acid (93%) 68 and this pH range of the Re-enhanced solution 37' is maintained for a period of two hours while the solution is circulated at 60 gpm via pump 76 in order to coordinate the perrhenate ion with the resin bed 46. The solution content of seven samples or "totes" of solution 37' before and after passing through resin bed 46 are summarized in Table 1 below. All the totes were processed according to aspects of the invention. Following tote "17W-20W," the resin 46 is "fully loaded" with perrhenate.

Column A in Table 1 identifies the catalyst batches (or "totes") through which the solution samples were passed to produce the solution containing rhenium, solution 37' in FIG. 2. Column B is the mass of the sample container and sample solution; column C is the mass of the container holding the sample (that is, the "tare"); and column D is the net mass of the sample solution 37', that is, the difference between column B and column C. Column E is the initial rhenium content of the solution, in ppm, prior to passing the solution through resin bed 46, and column F is the final rhenium content of the solution after the solution has been passed through the resin bed 46. Rhenium content is determined by ICP analysis. Column G is the initial rhenium mass corresponding to the ppm rhenium that appears in column E; column H is the mass of the rhenium charged or coordinated on resin bed 46; and column I is the mass of the residual rhenium remaining in the rhenium-depleted stream, stream 66 in FIG. 2. The data for the rhenium coordinated onto resin 46 in column H may be obtained by subtracting the initial mass of rhenium in G from the residual mass of rhenium left in solution from column I. For example, the data for solution sample 1W-4W indicates that sample solution 1W-4W has a mass of 956.9 kg [column D], an initial Re content of 1100 ppm [E] corresponding to an initial mass of 1.05 kg [G]; a final Re content of 78 ppm [F] corresponding to a final mass of 0.07 kg [I], and mass of Re coordinated in the resin of 0.98 kg [H], that is, 1.05 kg-0.07 kg. As indicated in Table 1, the content of the rhenium coordinated on the resin [column H] appears to be directly related to the content of the rhenium in the strip solution 37' introduced to the resin bed.

Comparing columns E and F of Table 1 indicates the relative coordination of the rhenium on the resin 46 according to aspects of the invention. As indicated in the bottom of Table 1, the total rhenium in all 20 totes in this experiment, that is, the total of the masses listed in column G is 9.22 kg of rhenium. Also, the bottom of Table 1 indicates that the total rhenium coordinated on the resin, that is, the sum of the masses in column H, is 8.71 kg. This corresponds to a rhenium coordination on resin efficiency according to one aspect of the invention of about 94.47%. The data in Table 1 indicate that in these experiments according to aspects of the invention, 94.47% of the perrhenate ion coordinated onto the resin from the peroxide solutions 37'.

TABLE 1

Experimental Results of Rhenium Charging of Resin Bed [46] with Stripping Solution [37'] Removed from Substrates [34] according to aspects of the Invention Stripping Solutions [37' in FIG. 2] content after passing through resin bed [46][2].

| A<br>Tote # | B<br>Mass<br>(kg) | C<br>Tare<br>(kg) | D<br>Net<br>Mass<br>(kg) | E<br>Re<br>Initial<br>(ppm) | F<br>Re<br>Final<br>(ppm) | G<br>Total<br>Initial<br>Re (kg) | H<br>Re on resin[2]<br>(kg) | I<br>Aqueous<br>Re<br>(kg) |
|---|---|---|---|---|---|---|---|---|
| 1W-4W | 1095.2 | 138.3 | 956.9 | 1100 | 78 | 1.05 | 0.98 | 0.07 |
| 5W-8W | 1145.3 | 139.5 | 1005.9 | 2000 | 56 | 2.01 | 1.96 | 0.06 |
| 1W-8W | 1401.4 | 149.9 | 1251.5 | 1500 | 85 | 1.88 | 1.77 | 0.11 |
| 9W-12W<br>(1 of 2)[1] | 672.2 | 134.7 | 537.5 | 1200 | 41 | 0.65 | 0.62 | 0.02 |
| 9W-12W<br>(2 of 2)[1] | 1183.0 | 140.8 | 1042.1 | 1200 | 41 | 1.25 | 1.21 | 0.04 |
| 13W-16W | 1481.2 | 149.7 | 1331.5 | 1200 | 58 | 1.60 | 1.52 | 0.08 |
| 17W-20W | 1169.6 | 154.2 | 1015.4 | 770 | 130 | 0.78 | 0.65 | 0.13 |
| Total Re in solution (kg) | | | | | | 9.22 | | |
| Total Re on resin (kg) | | | | | | | 8.71 | |
| Coordination efficiency, (%) | | | | | | | | 94.50 |

[1]Solution passed through totes 9W-12W was split in to samples due to sample size.
[2]Resin bed is 52.55 kg of A-170 weak base resin.

After loading or coordination of the perrhenate on the resin 46, the resin 46 is

TABLE 2

Elution of Rhenium from Resin [46'] Coordinated in Trials According to Table 1
(Rhenium continent determined by ICP analysis.)
The elution solution is a 29% ammonium hydroxide (NH$_4$OH) solution

| A<br>Drum | B<br>Mass<br>(kg) | C<br>Tare<br>(kg) | D<br>Mass<br>(kg) | E<br>% Re | F<br>Re (kg) |
|---|---|---|---|---|---|
| 1 | 185.5 | 10.2 | 175.3 | 3.10 | 5.43 |
| 2 | 178.3 | 10.0 | 168.3 | 1.10 | 1.85 |
| 3 | 156.5 | 10.2 | 146.3 | 0.41 | 0.60 |
| 4 | 215.2 | 10.2 | 205.0 | 0.15 | 0.31 |
| Total Re on Resin (kg) = 8.71 (From Table 1) | | | | | |
| Total Re Eluted (kg) | | | | | 8.19 |
| Elution Efficiency (%) | | | | | 94.03 | eluted. The elution trial data are summarized in Table 2. The elution solution 72 is 29% ammonium hydroxide (NH$_4$OH) solution. Three separate portions of 385 lbs (55 gallons) of ammonium hydroxide solution 72 are used to fully elute the Re from the resin 46 and to regenerate the resin 46. This is completed by circulating, via pump 76, the first 55 gallon drum of NH$_4$OH solution for 7 hours, the second 55 gallon drum of NH$_4$OH solution for 3.5 hours, and the third 55 gallon drum of NH$_4$OH solution for 3.5 hours. After circulation and before the addition of the next NH$_4$OH solution, each solution 72 is evacuated from the resin bed 46 and vessel 44. The resin bed 46 is rinsed with deionized water after the third and final NH$_4$OH solution is circulated through vessel 44. The results of these experiments are summarized in Table 2.

Column A in Table 2 identifies the volumes (or "drums") of ammonium hydroxide solution 72 circulated through the rhenium-coordinated resin 46' according to aspects of the invention. In this case, four (4) drums of ammonium hydroxide were passed through resin bed 46' coordinated with rhenium, as described with respect to the data in Table 1. Column B in Table 2 is the mass of the elution solution container and sample elution solution 72; column C is the mass of the container holding the sample solution (that is, the "tare"); and column D is the net mass of the ammonium hydroxide solution 72, that is, the difference between column B and column C. Column E is the rhenium content of the ammonium hydroxide solution 74, in percent (as determined by ICP analysis), after the hydroxide solution has been passed through the resin as described above. Column F is the mass of the rhenium in the ammonium hydroxide solution 74 corresponding to the percent concentration indicated in column E and the mass in column D. For example, the data for "Drum 1" in Table 2 indicates that sample elution solution has a mass of 175.3 kg [column D] and a Re content of 3.10% [E] corresponding to an Re mass of 5.43 kg [F] in the ammonium hydroxide solution 74 after elution. As indicated in Table 2, the content of the rhenium in the ammonium hydroxide after elution is greatest after the initial elution (that is, Drum 1) and then decreases as subsequent ammonium hydroxide is passed through the resin.

As indicated in the bottom of Table 2, the total rhenium in all four drums in this experiment, that is, the total rhenium coordinated on the resin in the trials summarized in Table 1 is 8.71 kg. Also, the bottom of Table 2 indicates that the total rhenium eluted from the resin, that is, the sum of the masses in column F, is 8.19 kg. This corresponds to a rhenium elution from the resin efficiency according to one aspect of the invention of about 94.03%. The data is Table 2 indicate that in these experiments according to aspects of the invention, 94.03% of the perrhenate coordinated onto the resin can be eluted with ammonium hydroxide solution 74.

Combining the coordination on resin efficiency indicated in Table 1, that is, the 94.47%, with the elution efficiency indicated in Table 2, that is, 94.03%, provides an overall rhenium recovery efficiency of 88.83% (that is, 8.19 kg/9.22 kg×100) according to aspects of the invention. Thus, according to aspects of the invention, at least about 80% recovery efficiency for rhenium from rhenium containing catalyst can be provided according to aspects off the invention, typically, at least an 85% recovery efficiency can be provided.

2) Hydrogen Peroxide Stripping, Strong Base Ion Exchange Resin Processing

In this second set of experiments, the oxidizing agent used was again hydrogen peroxide ($H_2O_2$). In this experiment, an aqueous $H_2O_2$ solution 37 is prepared in a holding tank 36 by slowly adding two 55-gallon drums of 50 weight percent $H_2O_2/H_2O$ to 400 gallons of water to provide about a 12% $H_2O_2$ solution 37. As in experiment 1, the solution 37 is circulated through a total of four different reactors 32 containing alumina substrates 34 having Ag catalyst and Re promoter following the procedure described above.

A strong base resin (A-600 by Purolite) 46 is used to capture the perrhenate ion ($ReO_4^-$) from the alumina substrate strip solutions. The rhenium is coordinated with the resin 46 by recirculating the solution 37' in the same way as the weak base resin discussed in experiment 1 above, but no pH adjustment is necessary. Again, solution 37' is circulated through resin 46 until resin 46 is fully loaded with perrhenate. Once coordinated or loaded, the Re is eluted from the resin 46 with 9M nitric acid ($HNO_3$) 72 in deionized water. In this aspect of the invention, in order to regenerate the resin 46 for further use, a ten percent sodium hydroxide solution in deionized water is passed through the resin. In this experiment, the elution level for this strong base resin is 90% of the rhenium contained.

3) Hydrogen Peroxide Stripping, Concentration by V*SEP®

In this third set of experiments, the oxidizing agent used was again hydrogen peroxide ($H_2O_2$). In this experiment, an aqueous $H_2O_2$ solution 37 is prepared in a holding tank 36 by slowly adding two 55-gallon drum of 50 weight % $H_2O_2/H_2O$ to 400 gallons of water to provide about a 12% $H_2O_2$ solution 37. As in experiments 1 and 2, the solution 37 is circulated through a total of four different reactors 32 containing alumina substrates 34 having Ag catalyst and Re promoter following the procedure described above.

After stripping of the Re from the substrates 34, a sample of the strip solution 37' was sent to an independent laboratory, New Logic Research, for concentration on a VSEP reverse osmosis concentration unit. The VSEP unit was able to concentrate the initial rhenium-containing volume to five percent of its original volume, or a 20× concentration.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A process for recovering compounds having rhenium from catalyst substrates from an ethylene epioxidation process, the catalyst substrates having a silver (Ag) catalyst and rhenium (Re) catalyst promoter, the process comprising:
   without prior heating of the catalyst substrates, contacting the catalyst substrates from the ethylene epioxidation process with a first liquid solution containing a peroxide to oxidize and remove at least some of the rhenium from the substrates to directly produce a second liquid solution containing rhenium; and
   isolating at least some of the rhenium by passing the second liquid solution containing the rhenium through a weak basic ion exchange resin to capture at least some of the rhenium on the ion exchange resin, and passing a third basic liquid solution through the ion exchange resin to remove at least some of the rhenium from the ion exchange resin to produce a fourth liquid solution containing compounds having rhenium.

2. The process as recited in claim 1, wherein the peroxide comprises at least one of hydrogen peroxide and sodium peroxide.

3. The process as recited in claim 1, wherein the peroxide comprises hydrogen peroxide having a concentration of between about 5% and about 25%.

4. The process as recited in claim 1, wherein contacting the substrates with the peroxide to remove at least some of the rhenium produces a second solution containing oxidized rhenium compounds.

5. The process as recited in claim 1, wherein the third basic liquid solution comprises at least one of ammonium hydroxide and sodium hydroxide.

6. The process as recited in claim 1, wherein the peroxide comprises a peroxide having little or no potential to strip the silver from the substrate.

7. The process as recited in claim 1, wherein the peroxide comprises a hydrogen peroxide solution having a weight percent hydrogen peroxide between about 5% and about 15%.

8. The process as recited in claim 1, wherein the compounds having rhenium comprise perrhenates.

9. The process as recited in claim 1, wherein the method further comprises, prior to isolating at least some of the rhenium, adjusting the pH of the second solution containing rhenium.

10. The process as recited in claim 9, wherein adjusting the pH of the second solution containing rhenium comprises adjusting the pH to between about 3.0 and about 3.5.

11. A process for recovering compounds having rhenium (Re) from catalyst substrates from an ethylene epioxidation process, the catalyst substrates having a silver (Ag) catalyst and rhenium (Re) catalyst promoter, the process comprising:
    contacting the catalyst substrates from the ethylene epioxidation process with substantially water to remove at least some of the rhenium from the substrates to produce a second solution containing rhenium; and
    isolating at least some of the rhenium by passing the second solution containing the rhenium through a weak basic ion exchange resin to capture at least some of the rhenium on the basic ion exchange resin, and passing a third basic solution through the basic ion exchange resin to remove at least some of the rhenium from the basic ion exchange resin to produce a fourth basic solution containing compounds having rhenium.

12. The process as recited in claim 11, wherein contacting the substrates with substantially water comprises contacting the substrates with water alone with no other active species.

13. The process as recited in claim 11, wherein the third basic solution comprises at least one of ammonium hydroxide and sodium hydroxide.

14. The process as recited in claim 11, wherein the third basic solution comprises ammonium hydroxide.

15. The process as recited in claim 11, wherein the compounds having rhenium comprise perrhenates.

16. The process as recited in claim 11, wherein the method further comprises, prior to isolating at least some of the rhenium, adjusting the pH of the second solution containing rhenium.

17. The process as recited in claim 16, wherein adjusting the pH of the second solution containing rhenium comprises adjusting the pH to between about 3.0 and about 3.5.

18. The process as recited in claim 11, wherein the catalyst substrates comprise spent catalyst substrates.

* * * * *

UNITED STATES PATENT AND TRADEMARK OFFICE
CERTIFICATE OF CORRECTION

PATENT NO. : 8,187,561 B2
APPLICATION NO. : 11/950468
DATED : May 29, 2012
INVENTOR(S) : Michael S. Herman et al.

Page 1 of 1

It is certified that error appears in the above-identified patent and that said Letters Patent is hereby corrected as shown below:

In the Claims:

Column 15, line 51, claim 1, replace "epioxidation" with "epoxidation"

Column 15, line 55, claim 1, replace "epioxidation" with "epoxidation"

Column 16, line 31, claim 11, replace "epioxidation" with "epoxidation"

Column 16, lines 34-35, claim 11, replace "epioxidation" with "epoxidation"

Signed and Sealed this
Thirteenth Day of August, 2013

Teresa Stanek Rea
*Acting Director of the United States Patent and Trademark Office*